United States Patent
Noureddine et al.

(10) Patent No.: US 10,540,288 B2
(45) Date of Patent: Jan. 21, 2020

(54) EFFICIENT WORK UNIT PROCESSING IN A MULTICORE SYSTEM

(71) Applicant: Fungible, Inc., Santa Clara, CA (US)

(72) Inventors: Wael Noureddine, Santa Clara, CA (US); Jean-Marc Frailong, Los Altos Hills, CA (US); Felix A. Marti, San Francisco, CA (US); Charles Edward Gray, San Francisco, CA (US); Paul Kim, Fremont, CA (US)

(73) Assignee: Fungible, Inc., Santa Clara, CA (US)

( * ) Notice: Subject to any disclaimer, the term of this patent is extended or adjusted under 35 U.S.C. 154(b) by 0 days.

(21) Appl. No.: 15/949,692

(22) Filed: Apr. 10, 2018

(65) Prior Publication Data
US 2019/0243765 A1  Aug. 8, 2019

Related U.S. Application Data

(60) Provisional application No. 62/625,518, filed on Feb. 2, 2018.

(51) Int. Cl.
*G06F 12/08* (2016.01)
*G06F 12/0862* (2016.01)
(Continued)

(52) U.S. Cl.
CPC ...... *G06F 12/0862* (2013.01); *G06F 12/0804* (2013.01); *G06F 12/0855* (2013.01);
(Continued)

(58) Field of Classification Search
CPC ....... G06F 2212/602; G06F 2212/6022; G06F 2212/6026; G06F 2212/6028; G06F 9/30047; G06F 9/3802; G06F 9/3814
See application file for complete search history.

(56) References Cited

U.S. PATENT DOCUMENTS

| | | | | | |
|---|---|---|---|---|---|
| 5,828,860 | A | * | 10/1998 | Miyaoku | G06F 9/30043 712/207 |
| 6,021,473 | A | * | 2/2000 | Davis | G06F 12/0835 711/118 |

(Continued)

FOREIGN PATENT DOCUMENTS

WO    2014178854 A1    11/2014

OTHER PUBLICATIONS

Mingyu Wang, Zhaolin Li, A Spatial and Temporal Locality-Aware Adaptive Cache Design with Network Optimization for Tiled Many-Core Architectures. IEEE Transactions on Very Large Scale Integration (VLSI) Systems, vol. 25. No. 9, Sep. 2017 (Year: 2017).*

(Continued)

*Primary Examiner* — Khoa D Doan
(74) *Attorney, Agent, or Firm* — Shumaker & Sieffert, P.A.

(57) ABSTRACT

Techniques are described in which a system having multiple processing units processes a series of work units in a processing pipeline, where some or all of the work units access or manipulate data stored in non-coherent memory. In one example, this disclosure describes a method that includes identifying, prior to completing processing of a first work unit with a processing unit of a processor having multiple processing units, a second work unit that is expected to be processed by the processing unit after the first work unit. The method also includes processing the first work unit, and prefetching, from non-coherent memory, data associated with the second work unit into a second cache segment of the buffer cache, wherein prefetching the data associated with the second work unit occurs concurrently with at least a portion of the processing of the first work unit by the processing unit.

16 Claims, 7 Drawing Sheets

(51) Int. Cl.
*G06F 12/0891* (2016.01)
*G06F 12/0804* (2016.01)
*G06F 12/0855* (2016.01)

(52) U.S. Cl.
CPC .... *G06F 12/0891* (2013.01); *G06F 2212/154* (2013.01); *G06F 2212/6028* (2013.01); *G06F 2212/62* (2013.01)

(56) References Cited

U.S. PATENT DOCUMENTS

| | | | | |
|---|---|---|---|---|
| 6,314,491 | B1* | 11/2001 | Freerksen | G06F 12/0811 711/124 |
| 6,901,451 | B1* | 5/2005 | Miyoshi | G06F 13/4027 709/232 |
| 6,901,500 | B1* | 5/2005 | Hussain | G06F 9/3824 710/52 |
| 6,993,630 | B1* | 1/2006 | Williams | G06F 12/0862 711/118 |
| 7,035,914 | B1* | 4/2006 | Payne | G08B 25/085 340/7.29 |
| 7,486,678 | B1* | 2/2009 | Devanagondi | H04L 49/3072 370/394 |
| 7,822,731 | B1* | 10/2010 | Yu | G06F 12/0862 707/705 |
| 8,560,757 | B2 | 10/2013 | Pangbom et al. | |
| 8,850,101 | B2 | 9/2014 | Pangbom et al. | |
| 8,850,125 | B2 | 9/2014 | Pangbom et al. | |
| 8,966,152 | B2 | 2/2015 | Bouchard et al. | |
| 9,065,860 | B2 | 6/2015 | Pangbom et al. | |
| 9,569,366 | B2 | 2/2017 | Pangbom et al. | |
| 9,632,936 | B1 | 4/2017 | Zuckerman et al. | |
| 9,946,671 | B1* | 4/2018 | Tawri | G06F 13/28 |
| 2003/0043798 | A1* | 3/2003 | Pugel | H04B 7/18582 370/389 |
| 2005/0166086 | A1* | 7/2005 | Watanabe | G06F 11/1666 714/6.2 |
| 2006/0112226 | A1 | 5/2006 | Hady et al. | |
| 2008/0244231 | A1 | 10/2008 | Kunze et al. | |
| 2010/0318725 | A1* | 12/2010 | Kwon | G06F 11/1441 711/103 |
| 2011/0113184 | A1* | 5/2011 | Chu | G06F 1/30 711/103 |
| 2011/0173392 | A1* | 7/2011 | Gara | G06F 9/3004 711/122 |
| 2011/0238923 | A1* | 9/2011 | Hooker | G06F 12/0862 711/137 |
| 2012/0030431 | A1* | 2/2012 | Anderson | G06F 12/0862 711/137 |
| 2012/0314710 | A1* | 12/2012 | Shikano | H04L 47/10 370/392 |
| 2013/0028083 | A1* | 1/2013 | Yoshida | H04L 49/60 370/230 |
| 2014/0044128 | A1* | 2/2014 | Suresh | H04L 12/1854 370/390 |
| 2014/0187317 | A1* | 7/2014 | Kohler | H04N 21/4402 463/31 |
| 2015/0143045 | A1* | 5/2015 | Han | G06F 12/0862 711/122 |
| 2015/0325272 | A1 | 11/2015 | Murphy | |
| 2016/0092362 | A1 | 3/2016 | Barron et al. | |
| 2016/0364333 | A1 | 12/2016 | Brown et al. | |
| 2016/0364334 | A1 | 12/2016 | Asaro et al. | |
| 2017/0235581 | A1 | 8/2017 | Nickolls et al. | |
| 2019/0095333 | A1* | 3/2019 | Heirman | G06F 12/0862 |

OTHER PUBLICATIONS

International Search Report and Written Opinion of International Application No. PCT/US2018/026884, dated Oct. 12, 2018, 22 pp.
Hurson, "Advances in Computers, vol. 92," Jan. 13, 2014, Academic Press, XP055510879, 94-95 pp.
U.S. Appl. No. 15/939,227, filed by Pradeep Sindhu et al., filed Mar. 28, 2018.
U.S. Appl. No. 62/530,691, filed by Pradeep Sindhu et al., filed Jul. 10, 2017.
U.S. Appl. No. 62/559,021, filed by Pradeep Sindhu et al., filed Sep. 15, 2017.
U.S. Appl. No. 62/589,427, filed by Charles Edward Gray et al., filed Nov. 21, 2017.
U.S. Appl. No. 15/949,892, filed by Wael Noureddine et al., filed Apr. 10, 2018.
Office Action from U.S. Appl. No. 15/949,892, dated Jun. 26, 2019, 12 pp.
Response to Office Action dated Jun. 26, 2019, from U.S. Appl. No. 15/949,892, filed Sep. 26, 2019, 10 pages.
Notice of Allowance from U.S. Appl. No. 15/949,892, dated Nov. 5, 2019, 9 pages.
Response to Written Opinion dated Oct. 12, 2018, from International Application No. PCT/US2018/026884, dated Dec. 2, 2019, 5 pages.

* cited by examiner

EFFICIENT WORK UNIT PROCESSING IN A MULTICORE SYSTEM

CROSS REFERENCE

This application claims the benefit of U.S. Provisional Patent Application No. 62/625,518 filed on Feb. 2, 2018, which is hereby incorporated by reference herein in its entirety.

TECHNICAL FIELD

The disclosure relates to processing packets of information, for example, in the fields of networking and storage.

BACKGROUND

Network devices, e.g., firewalls, switches, routers, storage/compute servers or other network attached devices often utilize multiple core processor systems or multiple-processing unit systems to achieve increased performance. However, processing streams of data, such as network packets, with systems having multiple processing units can present many programming challenges. For example, it is often difficult to move processing of a packet or set of packets from one processing unit to another, such as for load balancing across the processing units. Transitioning program execution from one processing unit to another can be difficult and often requires brute force movement or mapping of state, cached data, and other memory pieces associated with the program execution. Maintaining consistency of cached data and other memory across processing units while achieving high-throughput and utilization is often extremely technically challenging. For example, when using coherent memory, significant processing overhead and delays may result from operations performed by a memory coherence protocol. When using non-coherent memory, the overhead of the coherence protocol is avoided, but some processing units might not have access to data cached by another processing unit.

SUMMARY

Techniques are described in which a system having multiple processing units processes a series of work units in a processing pipeline, where some or all of the work units access or manipulate data stored in non-coherent memory. In some examples, processing units may be processing cores, and in other examples, processing units may be virtual processors, hardware threads, hardware blocks, or other sub-processing core units. As described herein, a processing unit may perform operations on data as specified by a work unit. While processing the work unit, the processing unit may cache data from non-coherent memory into a segment of a cache associated with the processing unit, and perform operations specified by the work unit using that cached data. Once the work unit has completed processing, the processing unit may initiate a cache flush for the segment (or a portion of the segment) to write the dirty cache data back to the non-coherent memory. Transfer of ownership of the non-coherent memory or a portion of the non-coherent memory may be mediated by delivery of a work unit message to another processing unit. The delivery of the work unit message may be interlocked with (gated by) the flush of the data in the relevant cache segment.

In some examples described herein, techniques may be employed to encourage and/or achieve efficient processing of work units and high utilization of processing resources. For instance, each processing unit in a multi-processing unit system may be configured to cache data in two or more alternating cache segments, e.g., an active cache segment and a standby cache segment. In such an example, the active cache segment stores data associated with the current work unit that is being processed by a particular processing unit. The standby cache segment may be used for concurrently prefetching data associated with a second work unit expected to be processed in the future (e.g., the next work unit in a queue for that processing unit). By concurrently prefetching data associated with the second work unit, the processing unit may be able to more quickly and efficiently process the second work unit when that second work unit is dequeued for execution. For example, when processing of the current work unit is complete, and the second work unit is dequeued for execution, the processing unit may initiate the flushing of the active cache segment, swap its designation of the active and standby cache segments, and begin processing the second work unit in the newly designated active cache segment using the already-prefetched data. The processing unit may also initiate (or cause the initiation of) prefetching data associated with a new future work unit into that processing unit's standby segment (previously the active cache segment before the swap) for future processing. In this way the prefetching, from the non-coherent memory, data associated with the new future work unit may be performed concurrently with processing of the second work unit.

Performing operations on a series of work units through a series of processing units, pipelined processors, or other synchronized computational units, and prefetching data associated with future work units as described herein provides several technical advantages. For instance, transfer of ownership of non-coherent memory between processing units, as mediated by delivery of a work unit message as described herein, reduces data movement within the non-coherent memory and avoids the overhead of a full cache coherency protocol, while nevertheless ensuring the validity of relevant data in non-coherent memory for each processing unit. In some examples, such a result is attained by limiting cache flush operations to relevant segments of a cache, and/or only upon completion of a work unit.

Further, by prefetching the data for a work unit in advance of the work unit being queued (or dequeued) for execution by the processing unit, the processing unit may be able to achieve high utilization of processing resources. In other words, by employing prefetching techniques in accordance with one or more aspects of the present disclosure, a processing unit may be able to efficiently and quickly process work units without at least some delays that might otherwise result from accessing data from non-cache memory.

The details of one or more examples are set forth in the accompanying drawings and the description below. Other features, objects, and advantages of the disclosure will be apparent from the description and drawings, and from the claims.

DETAILED DESCRIPTION

Figure 1:
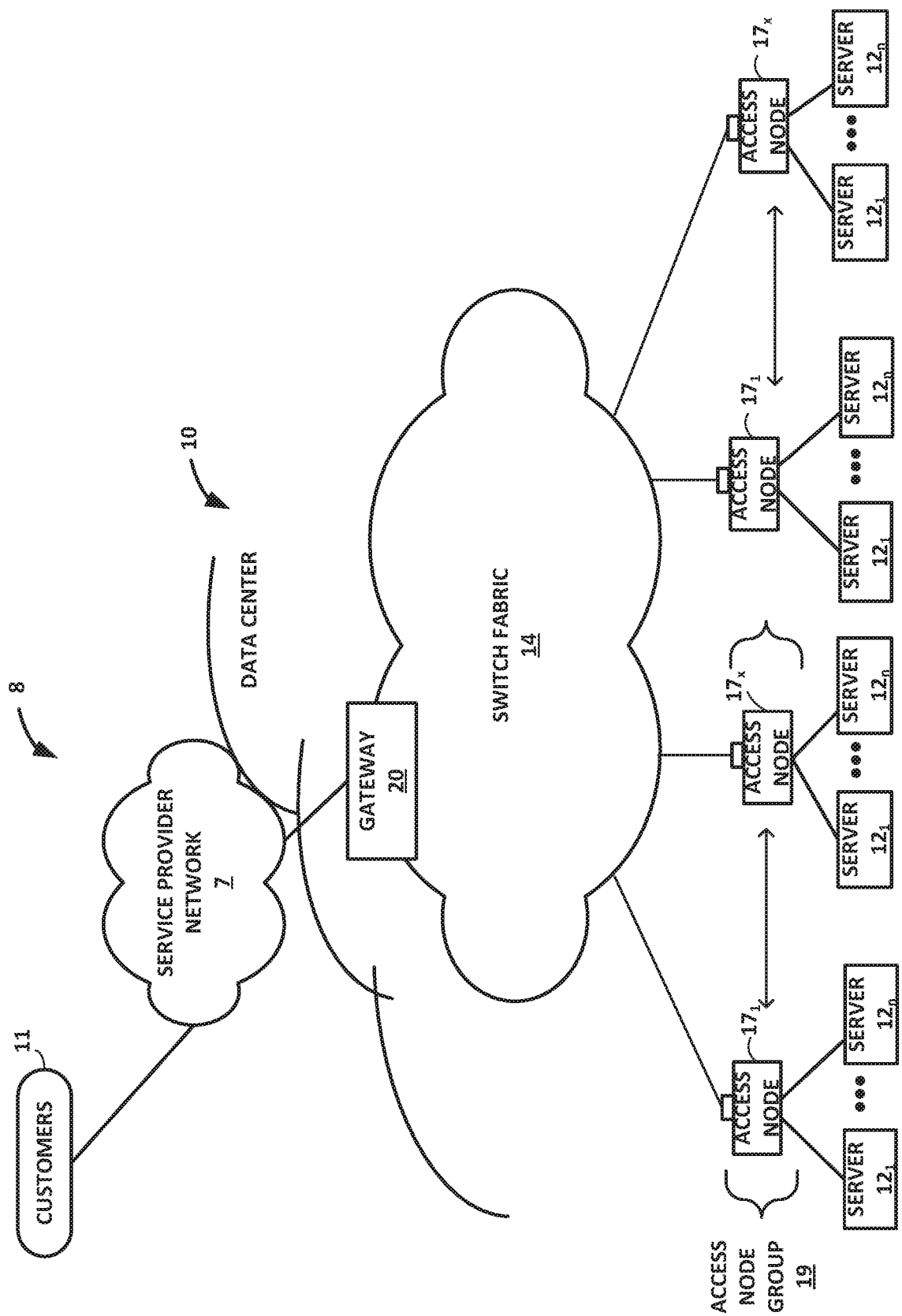
FIG. 1 is a block diagram illustrating an example network having a data center in which examples of the techniques described herein may be implemented.

FIG. 1 is a block diagram illustrating an example system 8 that illustrates one or more network devices configured to efficiently process a series of work units in a multiple core processor system. As described herein, techniques for caching and prefetching data from non-coherent memory may provide technical benefits that include improving the efficiency and utilization of processing cores within access nodes 17 in FIG. 1. In the example of FIG. 1, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

FIG. 1 is a block diagram illustrating an example system 8 having a data center 10 in which examples of the techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17 for processing streams of information, such as network packets or storage packets. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17_x$. In other examples, each access node may be implemented as a component (e.g., electronic chip) within a device, such as a compute node, application server, storage server, and may be deployed on a motherboard of the device or within a removable card, such as a storage and/or network interface card.

As further described herein, in one example, each access node 17 is a highly programmable I/O processor specially designed for offloading certain functions from servers 12. In one example, each access node 17 includes a number of internal processor clusters, each including two or more processing cores and equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the data center network architecture and interconnected access nodes illustrated in FIG. 1 are available in U.S. Provisional Patent Application No. 62/514,583, filed Jun. 2, 2017, entitled "Non-Blocking Any-to-Any Data Center Network with Packet Spraying Over Multiple Alternate Data Paths," the entire content of which is incorporated herein by reference.

Two example architectures of access nodes 17 are described below with respect to FIG. 2 and FIGS. 3, 4A, and 4B. With respect to either example, the architecture of each access node 17 comprises a multiple core processor system that represents a high performance, hyper-converged network, storage, and data processor and input/output hub. The architecture of each access node 17 is optimized for high performance and high efficiency stream processing.

A stream is defined as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of bytes read from a storage device. A stream of one type may be transformed into another type as a result of processing. Independent of the stream type, stream manipulation requires efficient fragment manipulation. An application executing on one of access nodes 17 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access units 17 can safely access different windows within the stream.

As described herein, processing of stream information may be associated with a "work unit." A Work Unit (WU) is a container that is associated with a stream state and used to describe (i.e. point to) data within a stream (stored in memory) along with any associated meta-data and operations to be performed on the data. In the example of FIG. 1, work units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. The work unit is associated with an amount of work that is relevant to the entity executing the work unit for processing a respective portion of a stream.

Stream processing is typically initiated as a result of receiving one or more work units associated with respective portions of the stream. In protocol processing, a portion would be a single buffer (e.g. packet). Within access nodes 17, work units may be executed by processor cores, hardware blocks, I/O interfaces, or other computational processing units. For instance, a processor core of an access node 17 executes a work unit by accessing the respective portion of the stream from memory and performing one or more computations in accordance with the work unit. A component of the one of access nodes 17 may receive, execute or generate work units. A succession of work units may define how the access node processes a flow, and smaller flows may be stitched together to form larger flows.

For purposes of example, each access node 17 may execute an operating system, such as a general-purpose operating system (e.g., Linux or other flavor of Unix) or a special-purpose operating system, that provides an execution environment for data plane software for data processing. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core.

Figure 2:
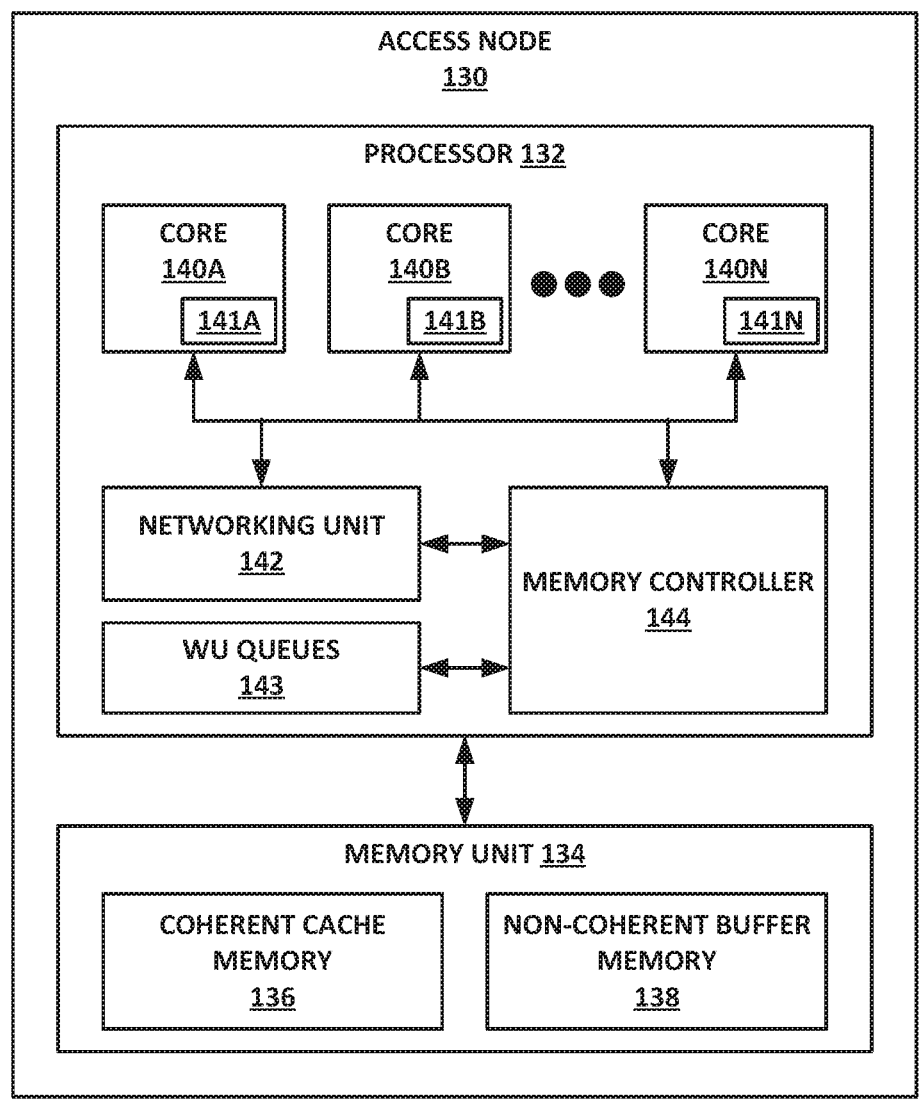
FIG. 2 is a block diagram illustrating an example access node including two or more processing cores.

FIG. 2 is a block diagram illustrating an example access node 130 including two or more processing cores. Access node 130 generally represents a hardware chip implemented in digital logic circuitry and may be used in any computing or network device. Access node 130 may operate substantially similar to any of access nodes 17 of FIG. 1. Thus, access node 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media.

In the illustrated example of FIG. 2, access node 130 includes a multi-core processor 132 having a plurality of programmable processing cores 140A-140N ("cores 140") coupled to an on-chip memory unit 134. Each of cores 140 includes a level 1 cache 141 (level 1 caches 141a, 141b, and 141n are associated with cores 140a, 140b, and 140n, respectively).

Memory unit 134 may include two types of memory or memory devices, namely coherent cache memory 136 and non-coherent buffer memory 138. Processor 132 also includes a networking unit 142, work unit (WU) queues 143, and a memory controller 144. As illustrated in FIG. 2, each of cores 140, networking unit 142, WU queues 143, memory controller 144, and memory unit 134 are communicatively coupled to each other. In some examples, processor 132 of access node 130 further includes one or more accelerators (not shown) configured to perform acceleration for various data-processing functions, such as look-ups, matrix multiplication, cryptography, compression, regular expressions, or the like.

In this example, access node 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. Access node 130 may also include one or more interfaces for connectivity to host devices (e.g., servers) and data storage devices, e.g., solid state drives (SSDs) via PCIe lanes. Access node 130 may further include one or more high bandwidth interfaces for connectivity to off-chip external memory.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System," the entire content of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to access node 130. The load/store unit may also include logic for flushing cache segments and/or cache lines to non-coherent buffer memory 138 and/or memory external to access node 130. In some examples, the load/store unit may be configured to prefetch data from main memory during or after a cache segment or cache line is flushed.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent memory 138 in a segment of the level 1 cache 141. As described herein, concurrent with execution of work units by cores 140, a load store unit of memory controller 144 may be configured to prefetch, from non-coherent memory 138, data associated with work units within WU queues 143 that are expected to be processed in the future, e.g., the WUs now at the top of the WU queues and next in line to be processed. For each core 140, the load store unit of memory controller 144 may store the prefetched data associated with the WU to be processed by the core into a standby segment of the level 1 cache 141 associated with the processing core 140.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
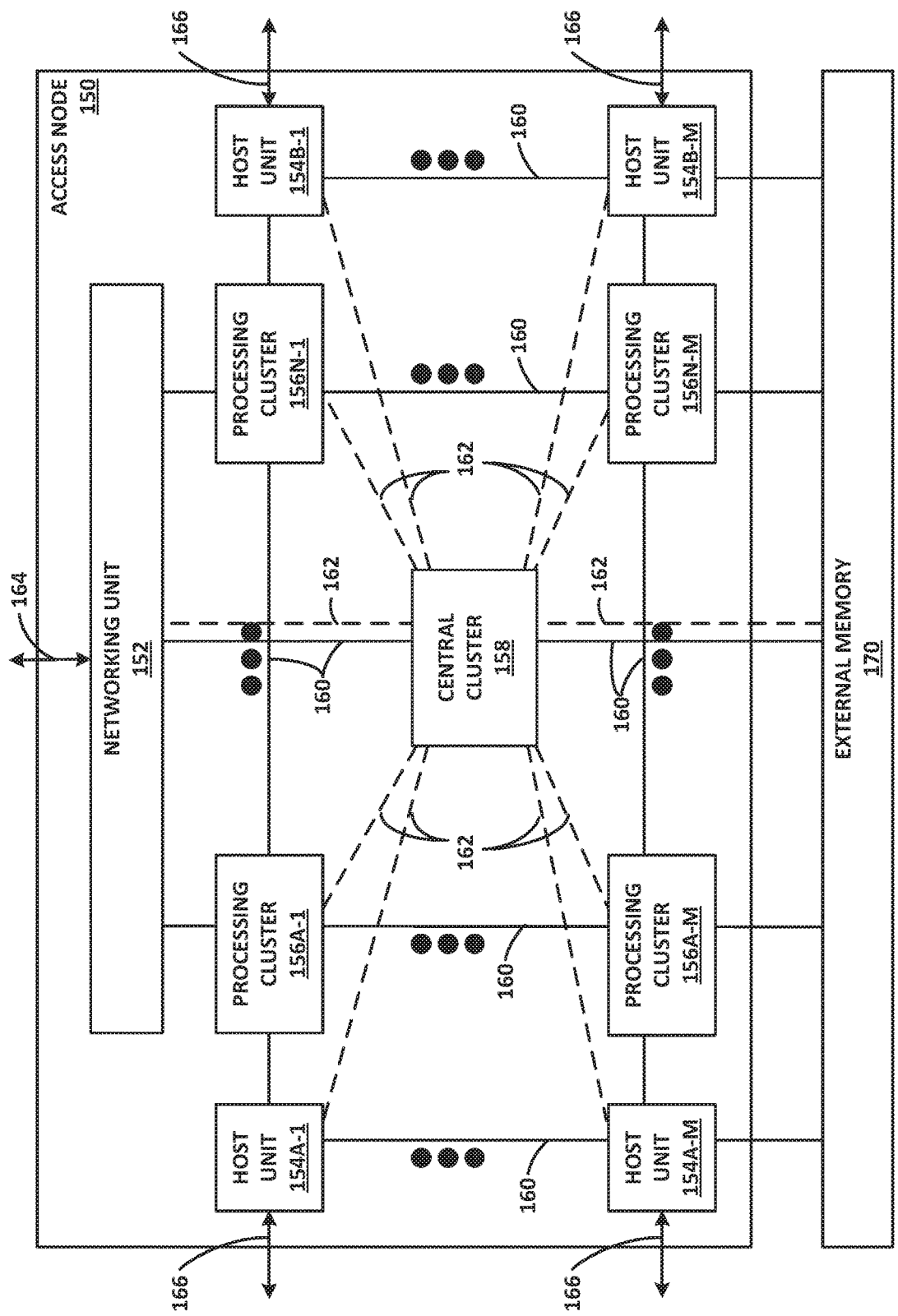
FIG. 3 is a block diagram illustrating an example access node including a networking unit, at least one host unit, and two or more processing clusters.

FIG. 3 is a block diagram illustrating one example of an access node 150 including a networking unit, at least one host unit, and two or more processing clusters. Access node 150 may operate substantially similar to any of the access nodes 17 of FIG. 1. Thus, access node 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. Access node 150 generally represents a hardware chip implemented in digital logic circuitry. As various examples, access node 150 may be provided as an integrated circuit mounted on a motherboard of a computing device or installed on a card connected to the motherboard of the computing device.

In general, access node 150 represents a high performance, hyper-converged network, storage, and data processor and input/output hub. As illustrated in FIG. 3, access node 150 includes networking unit 152, processing clusters 156A-1-156N-M (processing clusters 156), host units 154A-1-154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of access node 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows access node 150 to operate as an endpoint or as a root. For example, access node 150 may connect to a host system (e.g., a server) as an endpoint device, and access node 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

Access node 150 provides optimizations for stream processing. Access node 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

Access node 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of access node 150, as further described in U.S. Patent Application Ser. No. 62/589,427, filed Nov. 21, 2017, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

Figure 4A:
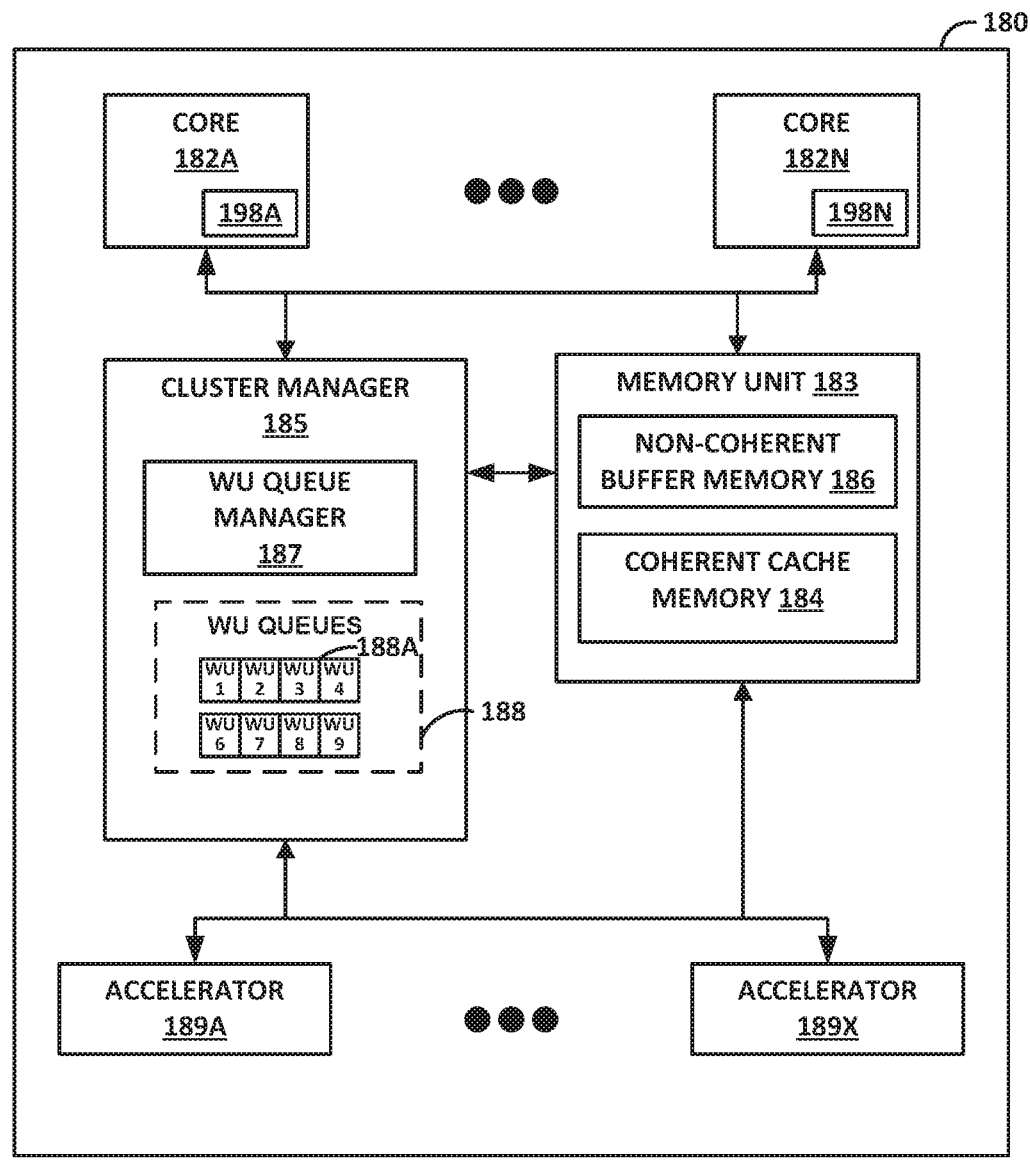
FIG. 4A is a block diagram illustrating an example processing cluster including two or more processing cores.

FIG. 4A is a block diagram illustrating another example processing cluster 180 including a plurality of programmable processing cores 182A-182N. Each of processing clusters 156 of access node 150 of FIG. 3 may be configured in a manner substantially similar to that shown in FIG. 4A. In the example of FIG. 4A, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node (such as access node 130 of FIG. 2 or access node 150 of FIG. 3) may support two distinct memory systems: a coherent memory system and a non-coherent buffer memory system. In the example of FIG. 4A, coherent cache memory 184 represents part of the coherent memory system while non-coherent buffer memory 186 represents part of the non-coherent buffer memory system. Cores 182 may represent the processing cores discussed with respect to access node 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the access node, which forwards the work unit to be queued in a virtual processor queue of WU queues 188.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 156A and/or external memory 170. Core 182A may first look for the corresponding data in cache 198A, and in the event of a cache miss, may access the data from non-coherent memory 156A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 4B:
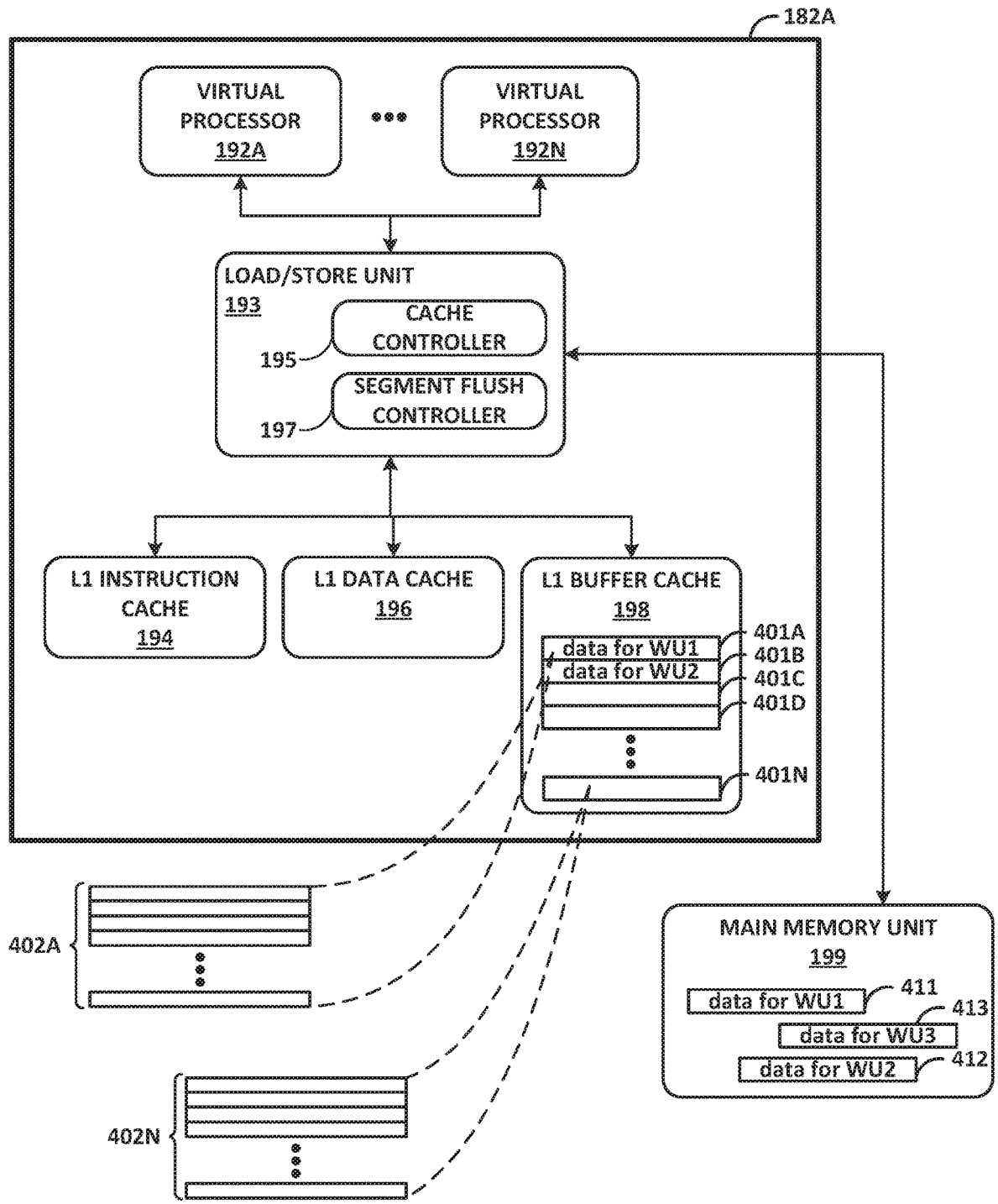
FIG. 4B is a block diagram illustrating an example processing core of a processing cluster.

FIG. 4B is a block diagram illustrating components of an example programmable processing core of a processing cluster. Core 182A of FIG. 4B may correspond to core 182A of FIG. 4A and may include components substantially similar to those of core 182A of FIG. 4A. In the example of FIG. 4B, core 182A is configured with one or more hardware threads, referred to as virtual processor 192A through virtual processor 192N (hereinafter "virtual processors 192"). In one example, virtual processors 192 may represent four virtual processors, but any number of virtual processors may be used. Core 182A includes load/store unit 193, which provides virtual processors 192 with access to level 1 (L1) instruction cache 194, L1 data cache 196, and L1 buffer cache 198. When each of cores 182 of FIG. 4A includes an L1 data cache similar to L1 data cache 196, the L1 data caches of cores 182 may share L2 coherent cache memory 184 of FIG. 4A. When one of virtual processors 192, such as virtual processor 192A, accesses data in memory, load/ store unit 193 accesses L1 data cache 196 or L1 buffer cache 198, based on the physical memory address issued by a memory management unit.

Load/store unit 193 includes cache controller 195 and segment flush controller 197. Cache controller 195 controls operations relating to caching of data within L1 instruction cache 194, L1 data cache 196, and/or L1 buffer cache 198. For example, cache controller 195 may determine, based on a memory address, whether a memory fetch operation corresponds to a cache hit or a cache miss. Cache controller 195 may access L1 buffer cache 198 in response to a cache hit, and may access a different memory unit following a cache miss. Segment flush controller 197 may provide a mechanism for requesting an automated flush of one or more cache lines 402 of L1 buffer cache 198. In some examples, segment flush controller 197 may enable an automated flush of all cache lines 402 within one or more cache segments 401 of L1 buffer cache 198. Segment flush controller 197 may also enable automated prefetching of data into one or more cache lines 402 of L1 buffer cache 198. In some examples, segment flush controller 197 may be capable of prefetching data into the same cache segment in which a flush operation is also taking place. During such an operation, segment flush controller 197 may ensure that none of the prefetched cache lines 402 are invalidated during the flush operation. Further, segment flush controller 197 may also enable automated prefetching of data from coherent memory into cache lines of L1 data cache 196. For instance, in some examples, flow state information (e.g., TCP state), and/or other information may be prefetched into (coherent) data cache 196. Such information may include data that enables a receiving device to process received data in a flow according to a transport protocol, such as a TCP connection, or to a storage protocol, such as NVMe. Further, prefetching operations involving L1 data cache 196 may take place simultaneously, or concurrently, with prefetching and/or cache flush operations involving L1 buffer cache 198. L1 buffer cache 198 may be smaller than L1 data cache 196. Core 182A may use L1 buffer cache 198 for non-coherent data retrieved from non-coherent buffer memory 186 and/or a main memory unit, such as packets or other data for software managed through the stream processing mode.

In some examples, main memory unit 199 may represent external and/or main memory (e.g., external memory 170 of FIG. 3), and may incorporate and/or represent multiple levels of cache memory above that of L1 buffer cache 198 (e.g., a Level 2 or Level 3 cache). L1 buffer cache 198 may store data from main memory unit 199 for short-term caching, so that the data is available for fast access. In FIG. 4B, main memory unit 199 is shown to be storing WU1 data 411, WU2 data 412, and WU3 data 413 in various locations within main memory unit 199. WU1 data 411 may be a network packet or storage packet that is associated with or is expected to be processed by a processing unit as specified by WU1. Similarly, WU2 data 412 is data (e.g., a network or storage packet) that is expected to be processed by a processing unit as specified by WU2, and WU3 data 413 is data (e.g., a network or storage packet) that is expected to be processed by a processing unit as specified by WU3.

In the example of FIG. 4B, L1 buffer cache 198 is segmented into multiple cache segments 401 (labeled cache segment 401A through cache segment 401N). Each cache segment may include multiple cache lines 402, organized into two or more ways and managed in a set associative fashion. For instance, as shown in FIG. 4B, cache segment 401A includes cache lines 402A, and cache segment 401N includes cache lines 402N. Each of the other cache segments 401 may be configured similarly, and each cache segment may include any number of cache lines. In some examples, each cache segment may be, or may be defined as, a logically associated group of cache lines. In other examples, some or all of the segments may correspond to groups of cache lines that are physically separate from other groups of cache lines. For instance, each cache segments may be partitioned by hardware attributes (e.g., different physical devices).

Further, in some examples, there are at least twice as many cache segments 401 as virtual processors 192, allowing for two segments to be assigned at a time to each of virtual processors 192. In such an example, cache controller 195 stores data associated with a particular work unit in separate cache segments 401, and for each of virtual processors 192, cache controller 195 maintains data in two segments: an active segment where buffer memory accesses are cached, and a standby segment that gets swapped with the active segment (designated as the now active cache segment for the core) at the appropriate time. By using two segments within L1 buffer cache 198 (e.g., and "active" and a "standby" segment), each of virtual processors 192 may efficiently process work units by concurrently prefetching data into one segment while operating on data in the other segment.

In the example of FIG. 4B, and in accordance with one or more aspects of the present disclosure, cluster manager 185 may queue a series of work units and deliver a work unit to virtual processor 192A. For instance, with reference to examples of FIG. 4A and FIG. 4B, cluster manager 185 queues a work unit ("work unit 1" or "WU1") in virtual processor queue 188A of WU queues 188 for virtual processor 192A. Cluster manager 185 may also queue additional work units "WU2," "WU3," and "WU4" so that consecutive work units in the queue for virtual processor 192A are WU1, WU2, WU3, and WU4. Eventually, cluster manager 185 dequeues WU1 from queue 188A, moving WU2 to the head of queue 188A. WU3 remains behind WU2 and is second in the queue, and WU4 remains in the position behind WU3 in the queue. Cluster manager 185 delivers WU1 via core interface to core 182A for processing. An interface unit of core 182A then delivers WU1 to virtual processor 192A.

Virtual processor 192A may process WU1. For instance, in the example of FIG. 4B, virtual processor 192A starts processing WU1. Before or during the processing of the work unit, load/store unit 193 loads from main memory unit 199 data and other information associated with WU1 into cache segment 401A. In the example of FIG. 4B, cache segment 401A is one of the cache segments 401 that is assigned to virtual processor 192A. In other words, in the example of FIG. 4B, load/store unit 193 loads, into cache segment 401A, WU1 data 411 from main memory unit 199, which may be a network packet, storage packet, or other unit of data that is the subject of processing by WU1. When WU1 is being processed, cache segment 401A serves as the active segment for virtual processor 192A, and cache segment 401B serves as the standby segment for virtual processor 192A. During processing of WU1, cache segment 401A therefore is used for caching some or all memory accesses performed during the processing of WU1. Virtual processor 192A completes processing WU1.

Virtual processor 192A may, after completing processing of WU1, initiate a flush of the active cache segment. For instance, in the example of FIG. 4B, virtual processor 192A signals the completion of WU1 to load/store unit 193. In response, load/store unit 193 causes segment flush controller 197 to initiate a flush operation for cache segment 401A (the active segment). Segment flush controller 197 flushes cache segment 401A by invalidating clean lines and writing modified data from cache segment 401A back to main memory unit 199. Virtual processor 192A or segment flush controller 197 may deliver, to another processor core 182 or to another virtual processor 192, a work unit message to mediate the transfer of ownership of non-coherent memory processed by WU1. In some examples, delivery of the work unit message signals that the cache flush operation is complete (or is sufficiently complete) such that another processing unit (e.g., virtual processor) can assume that the data associated with WU1 has been written to non-coherent memory (or to a shared cache) and can be assumed to be valid. Further discussion of gating access to non-coherent memory through messaging between cores and/or processing units is described in U.S. Provisional Patent Application No. 62/483,844, filed Apr. 10, 2017, and titled "Relay Consistent Memory Management in a Multiple Processor System," the entire content of which is incorporated herein by reference.

Virtual processor 192A may, after completing processing of WU1, initiate a prefetch of data into the active cache segment. For instance, continuing with the example of FIG. 4A and FIG. 4B, after segment flush controller 197 partially or fully completes the flush of cache segment 401A to main memory unit 199 (or in some examples, while cache segment 401A is being flushed to main memory unit 199), segment flush controller 197 starts prefetching WU3 data 413 into cache segment 401A. WU3 data 413 is data (e.g., a network packet) that is expected to be used by virtual processor 192A when processing WU3. WU2 is at the front of the queue, and WU3 is the work unit that is to be processed after WU2. Segment flush controller 197 prefetches WU3 data 413 into cache segment 401A, the same segment in which the cache flush operation is taking place (or has taken place). In some examples, a work unit message may specify the number of cache lines to be prefetched for WU3 data 413. For instance, such a message may specify which WU parameters are addresses that should be prefetched, and/or how many lines should be prefetched at each address. In some examples, the message that specifies the number of cache lines to be prefetched may be the work unit message that mediates the transfer of ownership of non-coherent memory processed by WU1. In other examples, the message may be a different or independent message.

As described herein, load/store unit 193 may, in response to a software instruction, perform a prefetch of data pointed to by parameters included within a work unit message. However, in some cases, the parameters included within a work unit message might not be valid addresses, and instead, may be simply metadata or other information. In some examples, load/store unit 193 may be configured to initiate the prefetch of one or more parameters within a work unit message in response to a software instruction (command). Load/store unit 193 may, in response to one or more of such a command, initiate a prefetch with respect to some or all of the parameters within the work unit message.

WU receive processing logic, which may be included within load/store unit 193, may determine that one or more parameters do not represent addresses, and for those parameters, WU receive logic replaces the parameter with an address value such that the load/store unit 193 may terminate (or not initiate) the prefetch operation when instructed by software. Accordingly, load/store unit 193 may be configured to make the prefetch operation, from a software perspective, simpler and/or to require fewer instructions to perform. In other words, in some implementations, software instructions can perform the prefetch of any parameter unconditionally, without checking or determining whether a parameter corresponds to prefetchable data. Load/store unit 193 makes a determination about whether the parameter corresponds to prefetchable data, based on characteristics of the parameter (i.e., whether it is a valid address or not). If load/store unit 193 determines that one or more parameters within the work unit message do not correspond to prefetchable data, load/store unit 193 may terminate (or not initiate) each such prefetch operation.

Virtual processor 192A may process WU2 using a different segment of L1 buffer cache 198. For instance, in the example of FIG. 4A and FIG. 4B, cluster manager 185 dequeues the next work unit for processing by virtual processor 192A. In the example being described, the next work unit is WU2. Cluster manager 185 delivers WU2 via core interface to core 182A for processing. An interface unit of core 182A delivers WU2 to virtual processor 192A. Virtual processor 192A swaps its active and standby segments, so that cache segment 401B serves as the active segment for virtual processor 192A and cache segment 401A serves as the standby segment for virtual processor 192A. After the active and standby segments are swapped, segment flush controller 197 may continue to carry out the cache flush operation and prefetch operation for cache segment 401A, which is now the standby segment. Virtual processor 192A processes WU2, using cache segment 401B for accessing and/or storing data used during processing of WU2. Virtual processor 192A completes processing WU2 and signals the completion of WU2 to load/store unit 193. Load/store unit 193 causes segment flush controller 197 to initiate a flush operation for cache segment 401B by writing the data from cache segment 401B to main memory unit 199. At the same time, or after the cache flush operation, segment flush controller 197 begins prefetching the data that may be used by virtual processor 192A when processing WU4. Segment flush controller 197 prefetches the data into cache segment 401B.

Virtual processor 192A may process WU3 using prefetched data for WU3. For instance, still referring to the example of FIG. 4A and FIG. 4B, cluster manager 185 dequeues WU3, which is the next work unit for processing by virtual processor 192A after WU2, and delivers WU3 to virtual processor 192A. Virtual processor 192A swaps its active and standby segments, so that cache segment 401A again serves as the active segment for virtual processor 192A and cache segment 401B again serves as the standby segment for virtual processor 192A. Virtual processor 192A processes WU3. As described above, a prefetch operation involving WU3 data 413 was previously initiated after WU1 was processed. Therefore, when virtual processor 192A starts processing WU3, the data for WU3 may have already been prefetched into cache segment 401A. Accordingly, virtual processor 192A may process WU3 more efficiently and/or faster to the extent that some or all of WU3 data 413 has been already prefetched into cache segment 401A.

More details on access nodes, including their operation and example architectures, are available in U.S. Provisional Patent Application No. 62/530,591, filed Jul. 10, 2017, entitled "Data Processing Unit for Computing Devices," and U.S. Provisional Patent Application No. 62/559,021, filed Sep. 15, 2017, entitled "Access Node for Data Centers," the entire content of each of which is incorporated herein by reference.

Figure 5:
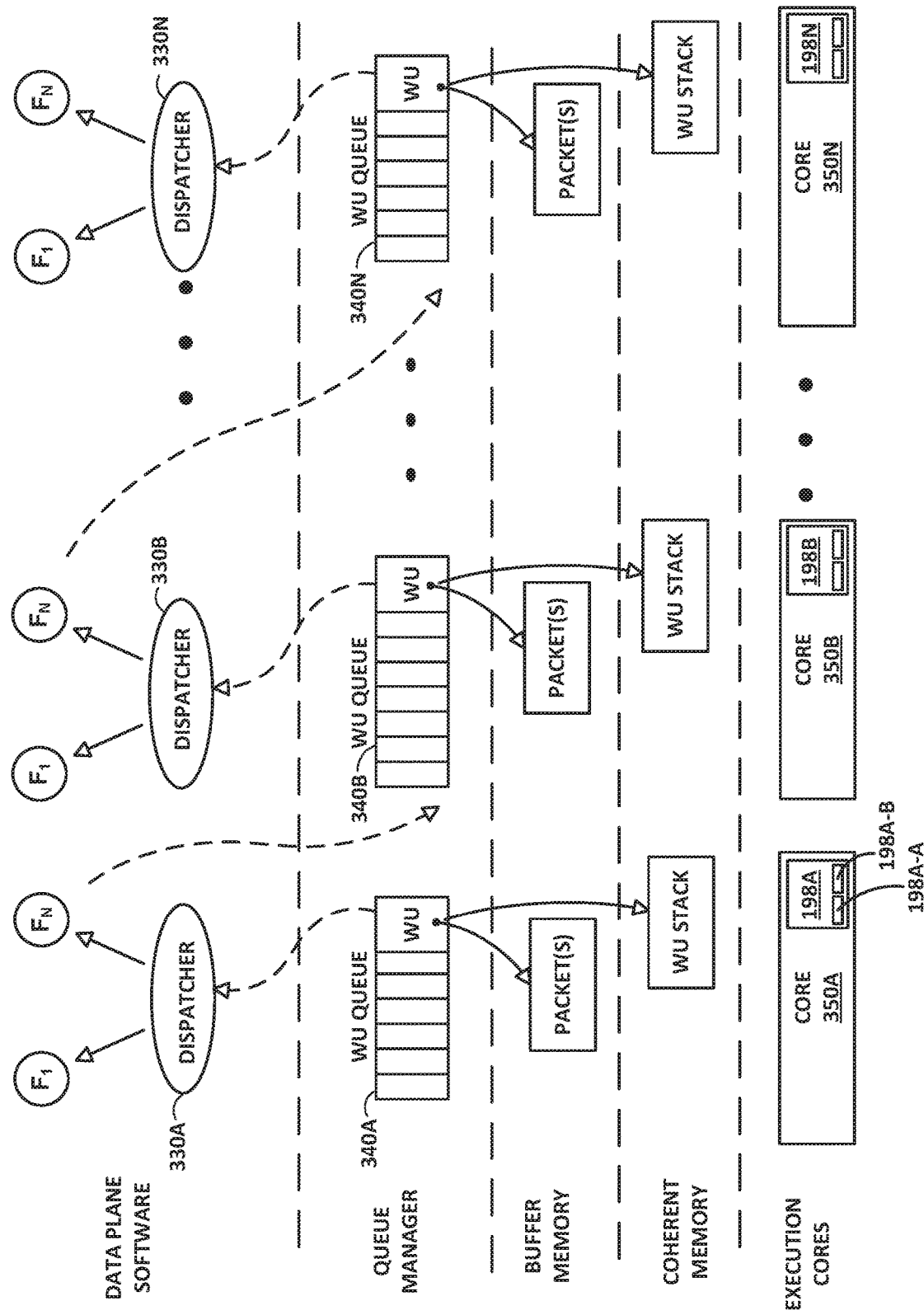
FIG. 5 is a flow diagram illustrating an example pipeline processing flow for processing stream data, such as packets, using work units.

FIG. 5 is a flow diagram illustrating an example pipeline processing flow for processing stream data, such as packets, within a multiple core processor system. FIG. 5 illustrates examples of multiple processing cores 350A-350N (which may correspond to cores 182 of FIG. 4A and FIG. 4B and include components similar to cores 182), and which may each include an L1 buffer cache 198A-198N (which may correspond to caches 198 of FIG. 4A and cache 198 of FIG. 4B). Each buffer cache 198 may be physically or logically partitioned into multiple segments. For instance, in FIG. 5, buffer cache 198 includes a number of segments, including segment 198A-A and 198A-B.

FIG. 5 also illustrates non-coherent buffer memory (which may correspond to non-coherent buffer memory 186 of FIG. 4A and/or data stored off-chip, e.g., in external memory 170 of FIG. 3), and coherent memory (which may correspond to coherent cache memory 184 of FIG. 4A and/or data stored off-chip, e.g., in external memory 170 of FIG. 3). Moreover, as shown in FIG. 5, each core 350 is associated with a queue of work units 340 (which may correspond to WU queues 143) to be processed by the core. WU queues 340 may, as one example, be hardware queues maintained by WU queue manager 187 of FIG. 4A. In other examples, WU queues 340 may, as one example, be queues maintained by a work unit manager of central cluster 158 of FIG. 3.

As shown in FIG. 5, each core 350 executes data plane software for processing stream data, such as packets. In this example, each core 350 provides an execution environment for a set of software functions, shown generally as F1-Fn, also referred to herein as event handlers or WU handlers. In some example implementations, each software function may be programmed in accordance with a run-to-completion programming model for applying one or more operations on stream data. Moreover, the various software functions may represent different, discrete code portions for performing higher-level operations on a packet. For example, a group of software functions may, when chained together for processing a common one or more work units, perform a high-level operation, such as encryption, authentication, deep-packet inspection, and the like. Each individual software function in the group may represent a different, run-to-completion code portion of the overall operation to be performed, and the software functions for the group may be executed on the same or different cores 350.

As shown in the example of FIG. 5, each processing core 350 executes a corresponding one of dispatchers 330A-330N that services the respective WU queue 340 to be processed by the core. Each dispatcher 330 accesses the respective WU queue 340 for its core and, based on data structures within the work unit at the head of the queue, instantiates an instance of a software function (F) for processing the work unit.

As described herein, each work unit within WU queues 340 is associated with stream data to be processed by the respective core. In one example, each work unit includes an association with (e.g., a pointer to) one or more packets and may also include an association with (e.g., a pointer to) a work unit stack ("WU stack") that carries program state, cached data and other information needed for program execution when processing the corresponding packet(s). As further described herein, in various examples, each work unit within WU queues 340 specifies (e.g., by an identifier or index) a software function F to be instantiated by dispatcher 330 for processing the work unit. In addition, each work unit includes an identifier for the core 350 or other hardware unit that sent the work unit and an identifier of the core 350 or other hardware unit to receive the work unit once processing is complete by the invoked software function F.

Upon instantiation by a dispatcher, the invoked software function F effectively provides seamless program execution to operate on the packet data associated with the work unit using the program state, cached data and other information specified within the corresponding WU stack. During execution, the software function F may, for example, execute as a run-to-completion event handler for performing one or more particular operations on the stream data. Moreover, continuity of program execution is maintained via the program state and cached data carried by the corresponding WU stack. While processing the work unit, the software function F may further manipulate the corresponding WU stack associated with the particular stream data object, e.g., packet, by performing stack-like operations on the WU stack for the packet and, optionally, directing the queue manager to create additional work units for further processing the packet.

As further described herein, when processing a work unit, the corresponding instance of the software function F invoked by the dispatcher may perform stack-like operations on the WU stack flowing along with the packet in the processing pipeline. In other words, the WU stack may be viewed as a set of work units that collectively implement an overall logical function, where the work units have not been yet been enqueued for processing. The work units are arranged in the WU stack in a stack format and may be manipulated (inserted, removed, etc.) by software functions F using stack operations to specify future work units for the overall logical function. The software function F may, for example, access a current frame within the WU stack for program state, cached data and any input or output variables for performing the corresponding function on the packet. In addition, the software function may effectively 'pop' the current frame from the WU stack, push additional work unit frames on the WU stack, and/or cause additional work units to be created and enqueued within WU queues 340 for performing additional code portions (functions) on the work unit. In this way, the WU stack may be used to facilitate program execution and pipelining of an overall logical function using multiple software functions, where it is undesirable to execute all operations in a single run-to-completion event on a single core.

The following illustrates an example application programming interface (API) that may be utilized by software functions (F) for interacting with and manipulating the WU stacks associated with stream data (e.g., packets) being processed by the multiple processing cores. As seen in this example, a software function (F) can manipulate a WU stack by performing stack-like operations, such as allocating a WU stack, freeing a WU stack, pushing new frames onto an existing WU stack. In addition, as shown below, the API further allows a software function to send a continuation in association with a specific frame pushed on a WU stack, which in turn causes a work unit having a pointer to the frame to be enqueued in a WU queue for processing. The example API is set forth below:

```
// Send the continuation on the top of stack
extern void ws_send_continuation(struct frame *);
// Push a new item on the stack
extern struct frame *ws_push_continuation(wuid_t, faddr_t
    dest, struct frame *, uintptr_t arg1, uintptr_t arg2);
// Free the WU stack
extern void ws_free(struct frame *frame);
// Allocate a new WU stack
extern struct frame *ws_alloc(void);
// Reserve space on the WU stack to store state
```

```
void *ws_malloc_on_stack(struct frame **, size_t);
// Push an exception
extern struct frame
    *ws_push_exception_continuation(wuid_t, faddr_t dest,
    struct frame *frame, uintptr_t arg1);
// Raise an exception
extern void ws_raise_exception(struct frame *);
```

The following example pseudo code illustrates an example pipelined loop when processing a work unit for core 350A of FIG. 5. In this example, processor core 350A ("P350A" in pseudocode below) may cache data in two alternating cache segments, Segment A and Segment B, which may correspond to segments 198A-A and 198A-B in FIG. 5, respectively. Each segment is alternately an active cache segment and a standby cache segment, where the active cache segment stores data associated with the current work unit that is being processed by a particular processing unit, and the standby cache segment may be used for prefetching data associated with a second work unit expected to be processed in the future (e.g., the next work unit in a queue for core 350A).

When the work unit is completed, the processing unit ("P350A") initiates a cache flush of the active segment and later (or at the same time) initiates a prefetch operation to load data associated with a future work unit into the active segment. In some examples, core 350A may deliver a work unit message to another core to transfer ownership of the non-coherent memory associated with the active cache segment. The loop may be executed numerous times, representing processing of numerous pipelined work units.

Figure 6:
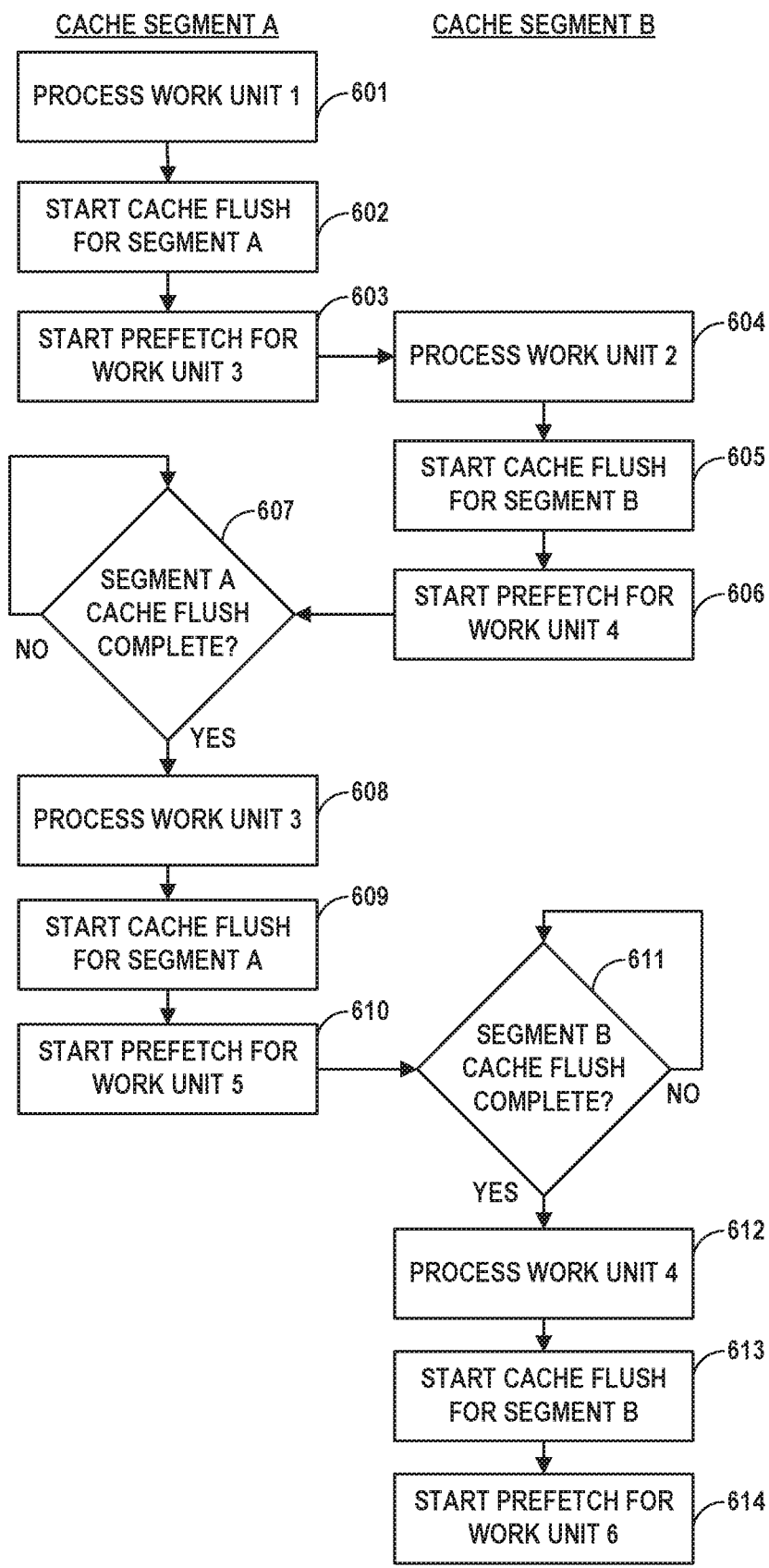
FIG. 6 is a flow diagram illustrating operations performed by an example processing unit, in accordance with one or more aspects of the present disclosure.

FIG. 6 is a flow diagram illustrating operations performed by an example processing unit, in accordance with one or more aspects of the present disclosure. FIG. 6 is described below within the context of operations performed by a processing unit, such as one or more of virtual processors 192 illustrated in FIG. 4B, processing an ordered series of consecutive work units (e.g., work unit 1 through work unit 6). The process of FIG. 6 is illustrated from two different perspectives: operations involving a first cache segment, such as one of cache segments 401 of FIG. 4B (left-hand column) and operations involving a second cache segment, such as a different one of cache segments 401 of FIG. 4B (right-hand column). In the example of FIG. 6, each segment is alternatively an active segment and a stand-by segment from the perspective of the processing unit (e.g., virtual processor 192A of FIG. 4B). In other examples, operations described in FIG. 6 may be performed by one or more other components, modules, systems, or devices. Further, in other examples, operations described in connection with FIG. 6 may be merged, performed in a difference sequence, or omitted.

In the example of FIG. 6, and in accordance with one or more aspects of the present disclosure, virtual processor 192A may process the first work unit in the series, work unit 1 (601). For example, with reference to FIG. 4A and FIG. 4B, virtual processor 192A receives a work unit from cluster manager 185, and processes the work unit. Virtual processor 192 processes work unit 1 by accessing and/or storing data associated with work unit 1 in one of the cache segments 401 of L1 buffer cache 198. In the example of FIG. 6, the cache segment used during processing of work unit 1 is "cache segment A."

Virtual processor 192A may start a cache flush for segment A (602). For instance, with reference to FIG. 4B, virtual processor 192A causes, after completion of processing of work unit 1, segment flush controller 197 to initiate a flush of segment A. Segment flush controller 197 may, during such a cache flush, write data to main memory unit 199. Virtual processor 192A or another component may deliver, to another virtual processor 192, a work unit message to mediate the transfer of ownership of non-coherent memory processed by work unit 1. In some examples, delivery of the work unit message signifies that the cache flush operation is complete (or is sufficiently complete) so that the other virtual processor can assume that the data associated with work unit 1, and stored in cache segment A, has been successfully flushed to non-coherent memory. In this way, the release and/or delivery of a work unit message to the other processor may be interlocked with (gated by) flushing of cache segment A.

Virtual processor 192A may start a prefetch for work unit 3 (603). For instance, again referring to FIG. 4B, virtual processor 192 causes segment flush controller 197 to prefetch, into cache segment A, data associated with a work unit expected to be processed by virtual processor 192A in the future. In the example of FIG. 6, virtual processor 192A is expected to process work unit 2 after processing work unit 1. When work unit 2 is processed by virtual processor 192A, virtual processor 192A may store and/or access data associated with work unit 2 in a different cache segment (e.g., cache segment B). Virtual processor 192A therefore initiates prefetching data associated with work unit 3 into segment A (work unit 3 is expected to be processed after work unit 2), so that the data associated with work unit 3 is prefetched while work unit 2 is being processed using cache segment B. In some examples, segment flush controller 197 prefetches the data associated with work unit 3 into segment A after the cache flush of segment A is completed. In other examples, segment flush controller 197 prefetches the data associated with work unit 3 into segment A at the same time, or concurrently with, the flush of segment A.

Virtual processor 192A may process work unit 2 (604). For instance, virtual processor 192A receives work unit 2 from cluster manager 185, and changes or swaps its active segment to a cache segment ("cache segment B") that is different than cache segment A, in preparation for processing work unit 2. After virtual processor 192A changes its active segment to segment B, any cache flush and/or prefetching operations still underway in segment A continue. Virtual processor 192A processes work unit 2 and stores and/or accesses data associated with work unit 2 in cache segment B.

Virtual processor 192A may start a cache flush for segment B (605). For instance, still with reference to FIG. 4B, virtual processor 192A completes processing of work unit 2. Virtual processor 192A causes segment flush controller 197 to initiate a flush of segment B, which may involve writing data from one or more lines of cache segment B to main memory unit 199. Virtual processor 192A may deliver, to another virtual processor 192, a work unit message to mediate the transfer of ownership of non-coherent memory processed by work unit 2, in a manner such that the release and/or delivery of a work unit message to the other processor may be interlocked with (gated by) flushing of cache segment B.

Virtual processor 192A may start a prefetch for work unit 4 (606). For instance, virtual processor 192 causes segment flush controller 197 to prefetch, into cache segment B, data associated with a work unit expected to be processed by virtual processor 192A in the future (e.g., work unit 4). Segment flush controller 197 may prefetch the data into segment B concurrently with the cache flush for segment B, or after the cache flush for segment B is completed.

Virtual processor 192A may, prior to processing work unit 3, determine whether the cache flush of segment A has been completed (607). For instance, virtual processor 192A changes its active segment back to cache segment A. Virtual processor 192A determines whether load/store unit 193 has completed the previously-initiated cache flush of segment A (see 602). When the cache flush of segment A has completed, virtual processor 192A processes work unit 3 (608). When processing work unit 3, virtual processor 192A may use data associated with work unit 3 that was previously prefetched into segment A (see 603), and may thereby process work unit 3 more quickly or efficiently. In some examples, virtual processor 192A may wait until some or all of the data associated with work unit 3 is fully prefetched into segment A. In other examples, virtual processor 192A may begin processing work unit 3 even if the prefetching operation is not complete.

Virtual processor 192A may start a cache flush for segment A (609). For instance, again with reference to FIG. 4B, virtual processor 192A completes processing of work unit 3 and causes segment flush controller 197 to initiate a flush of segment A. Transfer of ownership of that portion of non-coherent memory processed by work unit 3 may be gated by delivery of a work unit message when the flush of cache segment A is sufficiently complete.

Virtual processor 192A may start a prefetch operation for data associated with work unit 5 (610). For instance, virtual processor 192A causes segment flush controller 197 to prefetch, into cache segment A, data associated with a work unit expected to be processed by virtual processor 192A in the future (e.g., work unit 5).

Virtual processor 192A may process work unit 4 after determining that the cache flush of segment B has been completed (611, 612). For instance, virtual processor 192A again changes its active segment to cache segment B. Virtual processor 192A determines whether load/store unit 193 has completed the cache flush of segment B (initiated at 605). Once complete, virtual processor 192A processes work unit 4 (612), using data associated with work unit 4 that was previously prefetched into segment B (see 606).

Virtual processor 192A may continue the cycle illustrated in FIG. 6. For instance, virtual processor 192A may cause segment flush controller 197 to initiate a cache flush of segment B (613) and cause segment flush controller 197 to begin prefetching data associated with a future work unit into L1 buffer cache 198 (614). Virtual processor 192 may continue to change its active segment to the standby segment, process a work unit by operating on prefetched data, and initiate a cache flush and a new prefetch operation. Virtual processor 192A may again change its current active segment back to the current standby segment, and continue the cycle by processing the next work unit.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    identifying, prior to completing processing of a first work unit with a processing unit of a processor having multiple processing units, a second work unit that is expected to be processed by the processing unit after the first work unit, each of the first work unit and the second work unit associated with one or more stream fragments, and each of the first work unit and the second work unit specifying a work unit handler for processing the one or more stream fragments;
    processing, by the processing unit, the first work unit, wherein processing the first work unit includes accessing first work unit data associated with the first work unit and stored within a first cache segment of a level one (L1) buffer cache for the processing unit and generating, from the first work unit data, modified first work unit data;
    prefetching, from non-coherent memory, second work unit data associated with the second work unit into a second cache segment of the L1 buffer cache, wherein prefetching the second work unit data associated with the second work unit occurs concurrently with at least a portion of the processing of the first work unit by the processing unit;
    flushing, by the processing unit and after processing the first work unit, the first cache segment of the L1 buffer cache, wherein flushing the first cache segment includes storing, in the non-coherent memory, the modified first work unit data;
    generating, by the processing unit, a message indicating that the modified first work unit data can be accessed from the non-coherent memory;
    processing, by the processing unit, the second work unit, wherein processing the second work unit includes accessing the second work unit data associated with the second work unit prefetched into the second cache segment of the L1 buffer cache and generating, from the second work unit data, modified second work unit data;
    identifying, by the processing unit and prior to completing processing of the second work unit, a third work unit that is expected to be processed by the processing unit after the second work unit; and
    prefetching, by the processing unit and from the non-coherent memory, third work unit data associated with the third work unit into the first cache segment of the L1 buffer cache, wherein prefetching the third work unit data associated with the third work unit occurs concurrently with at least a portion of the processing of the second work unit by the processing unit and concurrently with at least a portion of the flushing the first cache segment.

2. The method of claim 1, wherein each of flushing the first cache segment, prefetching third work unit data associated with the third work unit, and processing the second work unit occur concurrently.

3. The method of claim 1, wherein generating the message indicating that the modified first work unit data generated by the first work unit can be accessed from the non-coherent memory occurs prior to completion of the flushing of the first cache segment, the method further comprising:
    delivering, by the processing unit to a second processing unit, the message, wherein delivering the message is gated by completion of the flushing of the first cache segment.

4. The method of claim 1, wherein generating the message indicating that the modified first work unit data generated by the first work unit can be accessed from the non-coherent memory transfers ownership of at least a portion of non-coherent memory.

5. The method of claim 1, wherein the message specifies lines of data associated with the third work unit to prefetch.

6. The method of claim 1, wherein prefetching second work unit data associated with the second work unit includes masking invalid addresses.

7. The method of claim 1, wherein at least one of the first work unit and the second work unit includes an identifier of a subsequent work unit for further processing the one or more stream fragments upon completion of the work unit.

8. The method of claim 1, wherein at least one of the first work unit and the second work unit includes one or more fields to store input or output arguments for processing the one or more stream fragments.

9. The method of claim 1, wherein at least one of the first work unit and the second work unit includes one or more fields to store auxiliary variables to be used when processing the stream fragment.

10. The method of claim 1, further comprising, prior to processing the first work unit and the second work unit, storing the first work unit and the second work unit in a work unit queue associated with the processing unit, and
    wherein identifying the second work unit that is expected to be processed by the processing unit after the first work unit comprises identifying the second work based on a position of the second work unit in the work unit queue.

11. The method of claim 1, further comprising:
    prefetching, from coherent memory, information including at least one of: header information and state information.

12. The method of claim 1, wherein each of the first work unit and the second work unit specify one of the processing units for executing the work unit handler.

13. The method of claim 1, wherein the first cache segment includes a first plurality of logically associated cache lines within the L1 buffer cache, and wherein the second cache segment includes a second plurality of logically associated cache lines within the L1 buffer cache.

14. A device comprising:
    a plurality of processing units, each of the processing units configured to execute one or more of a plurality of work unit handlers (WU handlers) for processing stream fragments, and wherein each of the processing units include a level one (L1) buffer cache;

a memory to store the stream fragments;

a plurality of queues configured to hold work units, each of the work units associated with one or more stream fragments, and wherein each of the work units identifies one of the WU handlers for processing the one or more stream fragments; and a load store unit configured to:

identify, prior to completion of processing of a first work unit by a first processing unit of the plurality of processing units, a second work unit that is expected to be processed by the first processing unit after the first work unit, wherein the first processing unit processes the first work unit by accessing first work unit data associated with the first work unit in an active segment of the L1 buffer cache included within the first processing unit and generating, from the first work unit data, modified first work unit data, prefetch, from the memory, second work unit data associated with the second work unit into a standby cache segment of the L1 buffer cache included within the first processing unit, wherein prefetching the second work unit data associated with the second work unit occurs concurrently with at least a portion of the processing of the first work unit by the first processing unit, flush, after the processing of the first work unit is complete, the active cache segment of the buffer cache, wherein flushing the active cache segment includes storing, in the memory, the modified first work unit data, and generate a message indicating that the modified first work unit data processed by the first work unit can be accessed from the memory.

15. The device of claim 14, wherein the memory is non-coherent memory, and wherein the first processing unit is configured to:

process the second work unit, wherein processing the second work unit includes accessing the second work unit data associated with the second work unit prefetched into the standby cache segment of the L1 buffer cache and generating, from the second work unit data, modified second work unit data.

16. A non-transitory computer-readable storage medium comprising instructions, that, when executed, cause processing circuitry of a device to:

identify, prior to completing processing of a first work unit, a second work unit that is expected to be processed by the processing circuitry after the first work unit, each of the first work unit and the second work unit associated with one or more stream fragments, and each of the first work unit and the second work unit specifying a work unit handler for processing the one or more stream fragments;

process the first work unit, wherein processing the first work unit includes accessing first work unit data associated with the first work unit and stored within a first cache segment of a level one (L1) buffer cache and generating, from the first work unit data, modified first work unit data;

prefetch, from non-coherent memory, second work unit data associated with the second work unit into a second cache segment of the buffer cache, wherein prefetching the data associated with the second work unit occurs concurrently with at least a portion of the processing of the first work unit;

flush, after processing the first work unit, the first cache segment of the L1 buffer cache by storing, in the non-coherent memory, the modified first work unit data;

generate a message indicating that the modified first work unit data associated with the first work unit can be accessed from the non-coherent memory;

process the second work unit by accessing, from the second cache segment of the L1 buffer cache, the second work unit data associated with the second work unit prefetched into the second cache segment of the L1 buffer cache;

identify, by the processing unit and prior to completing processing of the second work unit, a third work unit that is expected to be processed by the processing unit after the second work unit; and prefetch, by the processing unit and from the non-coherent memory, third work unit data associated with the third work unit into the first cache segment of the L1 buffer cache, wherein prefetching the third work unit data associated with the third work unit occurs concurrently with at least a portion of the processing of the second work unit by the processing unit and concurrently with at least a portion of flushing the first cache segment.

* * * * *